(12) United States Patent
Krause et al.

(10) Patent No.: US 10,034,427 B2
(45) Date of Patent: Jul. 31, 2018

(54) HARVESTING DEVICE

(71) Applicant: CLAAS SELBSTFAHRENDE ERNTEMASCHINEN GMBH, Harsewinkel (DE)

(72) Inventors: Thilo Krause, Glinde (DE); Rene Middelberg, Osnabrueck (DE); Bastian Kriebel, Muenster (DE)

(73) Assignee: CLAAS Selbstfahrende Erntemaschinen GmbH, Harsewikel (DE)

( * ) Notice: Subject to any disclaimer, the term of this patent is extended or adjusted under 35 U.S.C. 154(b) by 41 days.

(21) Appl. No.: 14/590,241

(22) Filed: Jan. 6, 2015

(65) Prior Publication Data

US 2015/0189832 A1   Jul. 9, 2015

(30) Foreign Application Priority Data

Jan. 8, 2014  (DE) ........................ 10 2014 100 136

(51) Int. Cl.
*A01D 43/073* (2006.01)
*A01D 43/08* (2006.01)
*A01D 41/12* (2006.01)

(52) U.S. Cl.
CPC ....... *A01D 43/073* (2013.01); *A01D 41/1217* (2013.01); *A01D 43/087* (2013.01)

(58) Field of Classification Search
CPC . A01D 41/1217; A01D 43/073; A01D 43/087
(Continued)

(56) References Cited

U.S. PATENT DOCUMENTS 2,161,073 A * 6/1939 Mehl ................. A01D 33/10
209/240
3,889,796 A * 6/1975 Baily .................. A01D 33/10
198/301
(Continued)

FOREIGN PATENT DOCUMENTS

EP         0274761 A1 *  7/1988  ......... A01D 41/1217
EP         2 020 174      2/2009
EP         2 100 495      9/2009

*Primary Examiner* — Charles A Fox
*Assistant Examiner* — Joseph J. Sadlon
(74) *Attorney, Agent, or Firm* — Collard & Roe, P.C.

(57) ABSTRACT

A harvesting system or device formed with an agricultural harvesting machine having a crop transfer device that that swivels about a swivel angle ($\varphi$) for transferring crop and allows for setting a setpoint swivel angle ($\varphi_{soll}$) for discharging the crop, and a hauling vehicle that receives the crop. The crop that is discharged from the agricultural harvesting machine impacts the hauling vehicle at an adjustable impact point. If the deflection of the transfer device deviates from the setpoint swivel angle ($\varphi_{soll}$), a return of the transfer device to the setpoint swivel angle ($\varphi_{soll}$) is regulated by changing the ground speed ($V_E$) of the agricultural harvesting machine, the ground speed ($V_T$) of the hauling vehicle or bother while maintaining a position of the impact point substantially unchanged.

11 Claims, 4 Drawing Sheets

(58) Field of Classification Search
USPC .................................................. 414/345, 809
See application file for complete search history.

(56) References Cited

U.S. PATENT DOCUMENTS

| | | | | | |
|---|---|---|---|---|---|
| 4,093,087 | A | * | 6/1978 | DeCoene | A01D 41/1217 198/668 |
| 4,395,194 | A | * | 7/1983 | Green | A01D 45/00 414/809 |
| 5,409,344 | A | * | 4/1995 | Tharaldson | B60P 1/42 198/314 |
| 5,468,113 | A | * | 11/1995 | Davis | B65G 33/32 198/550.1 |
| 5,538,388 | A | * | 7/1996 | Bergkamp | B60P 1/42 414/523 |
| 6,247,886 | B1 | * | 6/2001 | Signer | A01D 41/1217 414/523 |
| 6,358,143 | B1 | * | 3/2002 | Hurlburt | A01D 41/1217 414/502 |
| 6,682,416 | B2 | * | 1/2004 | Behnke | A01B 69/008 141/231 |
| 7,537,519 | B2 | * | 5/2009 | Huster | A01D 43/087 141/231 |
| 8,365,509 | B2 | * | 2/2013 | Tilly | A01B 73/00 56/228 |
| 8,428,829 | B2 | * | 4/2013 | Brunnert | A01D 43/087 56/10.2 F |
| 8,602,135 | B2 | * | 12/2013 | Kraus | A01B 69/008 180/14.1 |
| 8,662,972 | B2 | * | 3/2014 | Behnke | A01B 69/008 414/505 |
| 9,014,901 | B2 | * | 4/2015 | Wang | A01B 69/008 701/24 |
| 9,119,342 | B2 | * | 9/2015 | Bonefas | A01D 34/001 |
| 9,216,681 | B1 | * | 12/2015 | Van Mill | B60P 1/42 |
| 9,522,792 | B2 | * | 12/2016 | Bonefas | A01D 43/087 |
| 2009/0044505 | A1 | | 2/2009 | Hustrer et al. | |
| 2009/0229233 | A1 | | 9/2009 | Pollklas et al. | |
| 2012/0029732 | A1 | * | 2/2012 | Meyer | A01B 69/008 701/2 |
| 2012/0215394 | A1 | * | 8/2012 | Wang | A01D 41/1278 701/24 |
| 2014/0350801 | A1 | * | 11/2014 | Bonefas | A01D 43/087 701/50 |

* cited by examiner

HARVESTING DEVICE

CROSS-REFERENCE TO A RELATED APPLICATION

The invention described and claimed hereinbelow is also described in German Patent Application DE 10 2014 100 136.2, filed on Jan. 8, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to a harvesting device comprising an agricultural harvesting machine and a hauling vehicle, and to a method for regulating the ground speed for a harvesting device.

Agricultural harvesting machines that pick up and process crop, such as forage harvesters or combine harvesters, typically comprise a swivellable device for transferring the crop to a hauling vehicle, which can be a tractor-drawn trailer or a truck, for example. Depending on the type of harvesting machine, the transfer can take place continuously or discontinuously, wherein, in most cases the crop is transferred during the travel of the harvesting machine in order to make optimal use of time. The crop that is transferred by the swivellable transfer device lands at an impact point on the hauling vehicle. A swivelling of the transfer device in order to transfer the crop can be determined manually by an operator of the harvesting machine or automatically by a controller. The transfer device can be swivelled such that the position of the impact point is varied in order to utilize possibly all of the available hauling volume of the hauling vehicle. In order to minimize the loss of crop that occurs during the transfer, and to efficiently utilize the loading volume of the hauling vehicle, it is necessary for the operator of the harvesting machine to concentrate on the control of the transfer device during the transfer while also continuing to drive through the stand of crop to be harvested, whereby his workload is further increased.

Document EP 2 020 174 A1 makes known a device for transferring the crop from an agricultural harvesting machine to a hauling vehicle that is intended to relieve the operator by automatically controlling the transfer device. The agricultural machine in this case comprises a discharge spout for conveying the picked-up and processed crop, for the directional control of which an electro-optical device is provided. Such known arrangement is intended not only to relieve the operator but also to enable the hauling vehicle to be filled efficiently. However, the device still must be monitored by the operator, since problems can arise during the automatic swivelling of the transfer device, for example, due to collisions of the transfer device with the hauling vehicle. In addition, the transfer device may swivel out of the operator's direct field of vision, which would make it even more difficult to monitor the transfer process and may require that the operator take action.

Document EP 2 100 495 A1 makes known a further agricultural harvesting machine for picking up and processing crop, which comprises a transfer device able to swivel about a horizontal and a vertical axis for transferring crop to a hauling vehicle. The transfer device of the harvesting machine, when in the harvesting mode, is swivelled manually and/or automatically counter to the direction of travel of the harvesting machine, depending on various operating criteria of the harvesting machine. The operating criteria can be, for example, the ground speed for harvesting, the crop throughput rate and/or the steering angle of the harvesting machine. Such arrangement presumably makes it possible to transfer crop without loss during travel in the headland or while crossing gaps in the crop stand. But the automatically swivellable transfer device also requires that the operator pay very close attention so that he/she can take action in time if a problem should occur or if the transfer device should swivel out of the operator's direct field of vision.

SUMMARY OF THE INVENTION

The present invention overcomes the shortcomings of known arts, such as those mentioned above, with a harvesting device and method that make it possible to improve the control of a transfer device of an agricultural harvesting machine and to further reduce the workload of an operator of the agricultural harvesting machine.

In an embodiment, the invention comprises a crop-discharging agricultural harvesting machine having a transfer device, which can swivel about a swivel angle, for transferring the crop, wherein a setpoint swivel angle for discharging the crop can be set and a hauling vehicle, which receives the crop. The crop that is discharged from the agricultural harvesting machine impacts the hauling vehicle at an adjustable impact point, wherein, if the deflection of the transfer device deviates from the setpoint swivel angle, a return of the transfer device to the setpoint swivel angle is regulated by changing the ground speed of the agricultural harvesting machine and/or the hauling vehicle, wherein the position of the impact point remains substantially unchanged.

By changing the ground speed of the agricultural harvesting machine and/or the hauling vehicle, the harvesting machine and the hauling vehicle are oriented relative to one another during the transfer of the crop such that the swivelled transfer device is swivelled back into a setpoint swivel angle. The setpoint swivel angle is selected such that the transfer device is disposed in the direct field of vision of an operator of the harvesting machine and/or such that the transfer device has the greatest possible clearance from the hauling vehicle in order to prevent collisions with said hauling vehicle. This has the advantage that the swivelled transfer device can be returned to the setpoint swivel angle during the crop transfer while substantially retaining the impact point, thereby making it easier for the operator to monitor the transfer process. Such arrangement reduces the operator's workload. In addition, the danger of a collision of the transfer device with the hauling vehicle during a swivelling of the transfer device, e.g., when changing the impact point, is reduced, further reducing the amount of monitoring and work required of the operator.

In a development of the invention, a clearance between a free end of the transfer device that discharges the crop and the ground is varied depending on the swivel angle. The free end that discharges the crop is disposed on an end of the transfer device facing away from the harvesting machine. The clearance in this case is the clearance between the free end and a planar ground that sets in depending on the swivel angle of the transfer device, wherein during swivelling, the harvesting machine is disposed substantially horizontally on this planar ground.

The clearance can change depending on the swivel angle. For example, in the case of a harvesting machine in the form of a combine harvester, the transfer device can swivel about a swivel axis that is not vertically disposed. As a result, when the transfer device swivels, the free end can move, for example, along a curved trajectory having a varying clearance from the ground. By changing the clearance depending on the swivel angle of the transfer device, it is possible to derive the clearance of the free end, in particular from the ground, directly from the swivel angle.

Preferably, the setpoint swivel angle is selected and set such that, when the setpoint swivel angle is reached, the free end of the transfer device has the greatest clearance from the ground. This has the advantage that the free end also has the greatest possible clearance from a hauling vehicle that is disposed underneath the free end, thereby making it possible to avoid an unintended collision of the transfer device with the hauling vehicle, for example when the impact point changes.

In an embodiment, a return of the deflected transfer device to the setpoint swivel angle is automatically regulated. The harvesting device, in particular the harvesting machine, comprises at least one evaluation and control device that is suitable for the automatic regulation of the return, by which, in particular, the ground speed of the harvesting machine and/or of the hauling vehicle is regulated. An automatic return of the transfer device has the advantage that the operator does not need to carry out the return manually, whereby the workload of the operator is further reduced.

Advantageously, the point of impact of the crop is adjusted automatically and/or manually. This makes it possible to efficiently and automatically fill the hauling vehicle, which relieves the operator and allows the operator to intervene manually, for example, in order to permit filling specifically in an edge region of the hauling vehicle.

Given that the transfer device automatically tracks the impact point that was set, the operator is further relieved. The automatic adjustment and/or tracking of the impact point of the crop also makes it possible to use a transfer strategy when filling a hauling vehicle, for example, depending on the type of hauling vehicle.

In an embodiment, an operator selects at least one vehicle to be used to return the transfer device, wherein the ground speed of the vehicle is regulated. In this case, the operator selects at least one vehicle, namely the agricultural harvesting machine or the hauling vehicle, or both vehicles, the ground speeds of which are regulated to the setpoint swivel angle in order to return the transfer device. Particularly in the case of an automatic regulation of the return, this has the advantage that the operator has the opportunity to enter a requirement, for example, depending on which evaluation and control devices are installed in the harvesting machine and/or the hauling vehicle. In addition, the operator can select that only the ground speed of the hauling vehicle is regulated for the return, whereby the harvesting machine can continue harvesting at a higher ground speed during the transfer, further increasing the harvesting output.

In an embodiment, at least one evaluation and control device is provided for controlling the transfer device and the ground speed of the harvesting machine and/or the hauling vehicle. The ground speed of the harvesting machine and/or the hauling vehicle is controlled by the evaluation and control device depending on the deflection of the transfer device. The evaluation and control device controls the swivelling of the transfer device, for example, to activate a set impact point or during the return of the transfer device. Preferably, the impact point can be determined and set by the evaluation and control device, for example, on the basis of a transfer strategy.

In order to return the transfer device to the setpoint swivel angle, the evaluation and control device regulates the ground speed of the harvesting machine and/or the hauling vehicle depending on the swivel angle. The evaluation and control device can be disposed on the harvesting machine and/or the hauling vehicle. A plurality of evaluation and control units can comprise communication modules for wireless communication for the unidirectional and/or bidirectional transmission of data, in particular, regarding a ground speed of the particular vehicle to be regulated. The evaluation and control device has the advantage that the transfer device and the ground speeds for returning the transfer device are regulated in the most automated manner possible, reducing the workload of the operator accordingly.

In an embodiment, a sensor device is provided for determining the swivel angle and/or the deflection of the transfer device. The sensor device can be an electro-optical device, for example, a 3D camera. The sensor device is used to measure the current swivel angle relative to the longitudinal axis of the harvesting machine and/or a folded-in inoperative position of the transfer device. An electro-optical device permits contactless determination of the current swivel angle and/or a deflection that occurred about a certain angle, for example, when the transfer device swivels from a first impact point to a second impact point.

Moreover, an electro-optical sensor device, in the detection range of which the current first impact point and a subsequent second impact point to be activated are located, can determine a change in the swivel angle to be implemented even before or during the swivelling. This has the advantage that a change in the ground speed for the purpose of returning the transfer device can be carried out nearly simultaneously and, in particular, simultaneously, with the swivelling of the transfer device from the first to the second impact point. In addition, a pre-existing electro-optical sensor device can be used cost-effectively for the harvesting device in order to regulate the ground speed.

The invention also provides a method for regulating the ground speed of a harvesting device comprising a crop-discharging agricultural harvesting machine having a transfer device for transferring the crop (wherein the transfer device can swivel about a swivel angle) and a hauling vehicle which receives the crop at an impact point. The method includes adjusting a setpoint swivel angle for discharging the crop and the impact point. If the deflection of the transfer device deviates from the setpoint swivel angle, a return of the transfer device to the setpoint swivel angle by changing the ground speed of the agricultural harvesting machine and/or the hauling vehicle is regulated while the position of the impact point remains substantially unchanged.

It is advantageous that the swivelled transfer device can be returned to the setpoint swivel angle while substantially retaining the impact point that was set. As a result, the transfer device can be brought into a position that the operator can easily observe, in particular directly, thereby making it possible to reduce the workload of the operator. Further advantageously, the danger of a collision of the transfer device with the hauling vehicle during swivelling, e.g., when changing the impact point, is reduced, further reducing the workload for the operator, since there is less of a need for monitoring.

In an embodiment, a clearance between a free end of the transfer device that discharges the crop and the ground is varied depending on the swivel angle. A change in the clearance depending on the swivel angle is induced, for example by swiveling a transfer device about a single, non-vertically disposed swivel axis, which is possible when the harvesting machine is a combine harvester. A vertical swivel axis is disposed at a right angle relative to the ground.

By changing the clearance depending on the swivel angle of the transfer device, the clearance of the free end is derived directly from the swivel angle.

Preferably, the setpoint swivel angle is set such that, when the setpoint swivel angle is implemented, a free end of the transfer device has the greatest clearance from the ground. This has the advantage that the free end also has the greatest possible clearance from a hauling vehicle that is disposed under the free end, whereby it is possible to avoid an unintended collision of the transfer device with the hauling vehicle.

Most preferably, the return of the deflected transfer device is automatically regulated to the setpoint swivel angle while the position of the impact point remains substantially unchanged. An automatic return of the transfer device has the advantage that the operator does not need to carry out the return manually, whereby the workload of the operator is reduced.

In an embodiment, the impact point and/or a deflection of the transfer device is set manually or automatically. The automatic determination and adjustment and/or the deflection of the transfer device make it possible to efficiently and automatically fill the hauling vehicle, whereby the operator is greatly relieved. Due to the manual adjustment of the impact point and the deflection of the transfer device, the operator can advantageously intervene or entirely take control, thereby ensuring that transfer is safe and efficient in situations that could not be reliably handled by automatic control.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
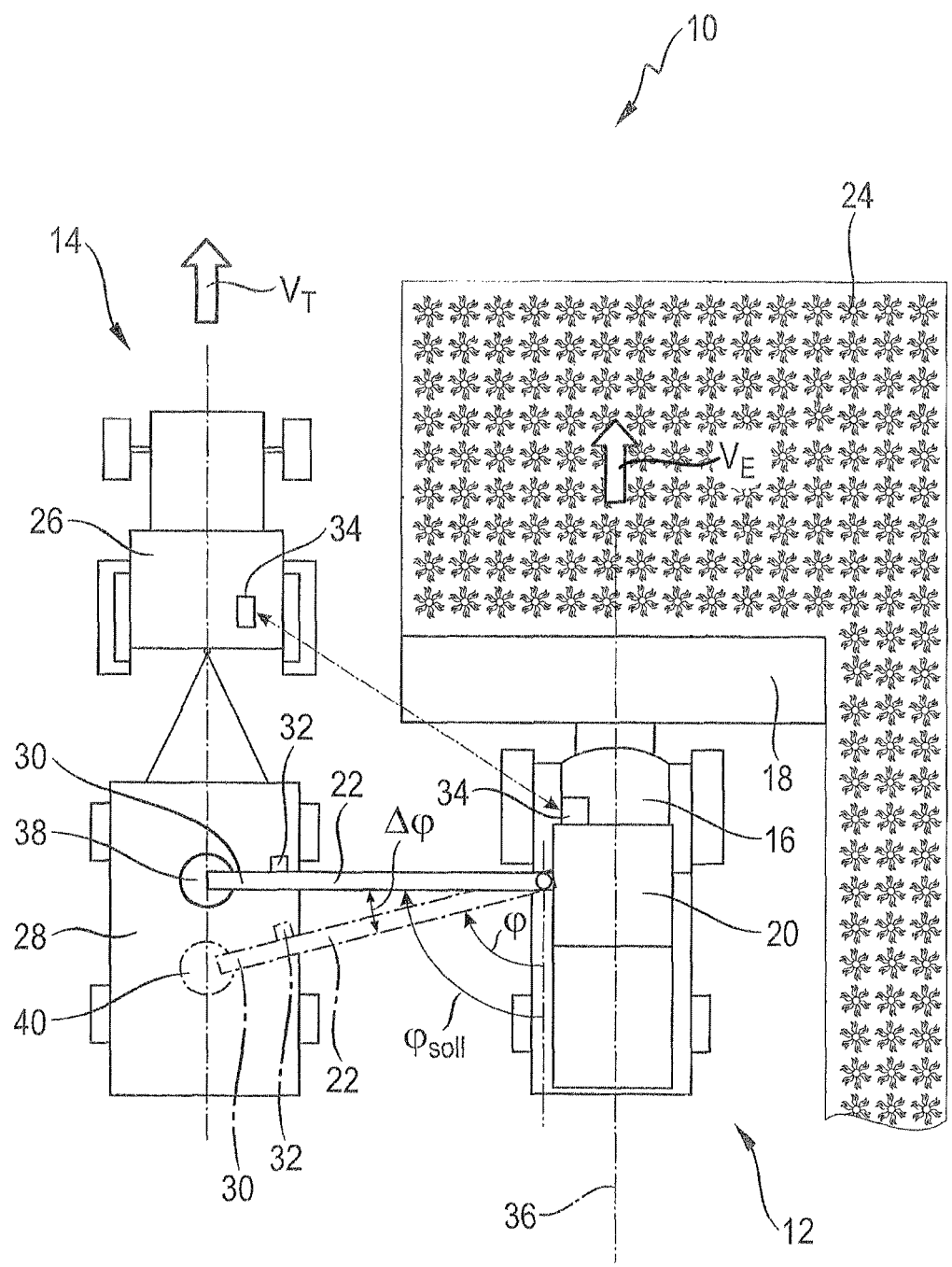
FIG. 1: shows a schematic top view of a harvesting device comprising an agricultural harvesting machine and a hauling vehicle.

FIG. 1 shows a harvesting system or device 10 comprising an agricultural harvesting machine 12 and a hauling vehicle 14 in a top view on a field during harvesting. The agricultural harvesting machine 12 shown is embodied as a combine harvester 16, the basic features of which are familiar to a person skilled in the art, and therefore a description of the usual assemblies thereof, such as the front attachment 18, the threshing mechanism, the cleaning unit, the grain tank 20, and the transfer device 22 can be largely omitted. The front attachment 18 picks up crop 24, at least a portion of which is accommodated in the grain tank 20 after processing. The crop 24 can be wheat, for example, wherein the threshed-out wheat kernels are accommodated in the grain tank 20 after processing. A different front attachment 18 can be selected and installed depending on the crop 24 to be harvested.

The crop 24 is transferred from the grain tank 20 of the combine harvester 16 to the hauling vehicle 14 discontinuously in intervals by the transfer device 22. The hauling vehicle 14 can be, for example, a truck or a tractor 26 having a trailer 28, as shown. An agricultural harvesting machine 12 within the meaning of the invention can be any self-propelled or externally propelled agricultural working machine that picks up and discharges crop 24, such as a forage harvester or the depicted combine harvester 16.

The transfer device 22 of the combine harvester 16 is mounted so as to be swivellable about at least one swivel axis 23. In order to transfer the crop 24, the transfer device 22 is swivelled about the swivel axis 23 out of an inoperative position into an operative position. The transfer device 22 is disposed, in the operative position, at a swivel angle $\varphi$ relative to the longitudinal axis 36 of the harvesting machine 12, wherein the swivel angle $\varphi$ of the transfer device 22 in an operative position is greater than 0°. The swivel angle $\varphi$ of the transfer device 22 that sets in is the actual swivel angle $\varphi_{ist}$.

Figure 2:
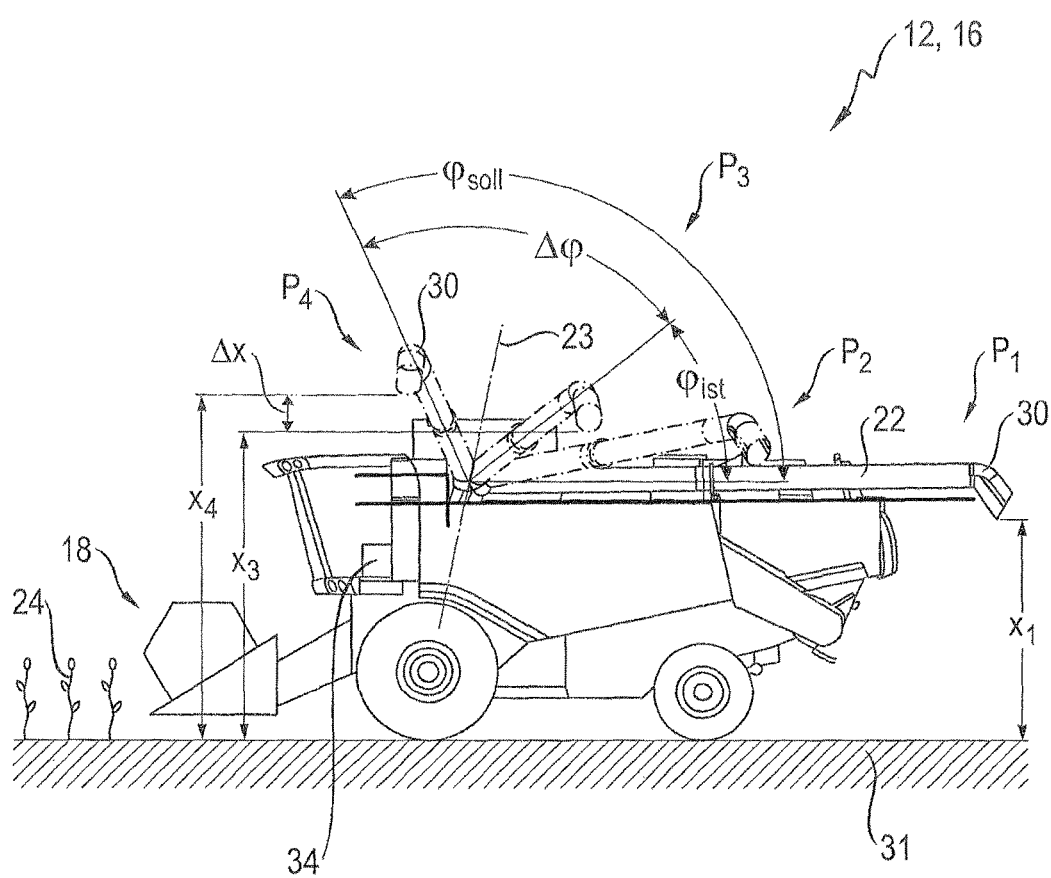
FIG. 2: shows a schematic side view of a harvesting machine comprising a transfer device, which is depicted in different positions.

Combine harvesters 16 (FIG. 2) typically have only one transfer device 22 that can swivel about a swivel axis 23, wherein the swivel axis 23 of the transfer device 22 is disposed so as to be slanted relative to the harvesting machine 12 and/or the ground 31. The swivel axis 23 of the combine harvester 16 depicted in FIG. 2 is slanted relative to the vertical such that the transfer device 22 moves on a correspondingly slanted circular trajectory. Due to the inclination of the circular trajectory, the free end 30 of the transfer device 22 is moved on a curved trajectory, for example, when the transfer device 22 is swivelled relative to the ground 31, wherein the clearance x (e.g., $x_1$, $x_2$, $x_3$) of the free end 30 from the ground 31 varies depending on the swivel angle $\varphi$.

The transfer device 22 is depicted in four different positions $P_1$, $P_2$, $P_3$ and $P_4$. In a first position $P_1$, which corresponds to a transport position of the transfer device 22, the transfer device 22 is disposed substantially parallel to the longitudinal axis 36, wherein the swivel angle $\varphi_{ist}$ is substantially 0°. In the transport position $P_1$, a free end 30 of the transfer device 22 that discharges the crop 24 has a clearance $x_1$ from the ground 31. The clearance $x_1$ is measured, for example, between a lower edge of the free end 30 and the ground 31.

In a second, a third, and a fourth position $P_2$, $P_3$ and $P_4$, respectively, the transfer device 22 is depicted as having been swivelled in each case about a corresponding swivel angle $\varphi$ relative to the longitudinal axis 36. In the second position $P_2$, and, in particular, in the third and fourth position $P_3$ and $P_4$, the transfer device 22 is swivelled into an operative position in order to transfer crop 24. The fourth position $P_4$ can be, for example, a particularly preferred setpoint position of the transfer device 22 for transferring crop 24, wherein, in the setpoint position of the transfer device 22, the corresponding swivel angle $\varphi$ corresponds to a setpoint swivel angle $\varphi_{soll}$.

Due to the slanted swivel axis 23, the transfer device 22 is swivelled on a circular trajectory that is also slanted, whereby, when the transfer device 22 swivels, the clearance x between the free end 30 of the transfer device 22 and the ground 31 varies depending on the swivel angle φ. For example, when the transfer device 22 is swivelled out of the fourth position $P_4$, the setpoint position, into the third position $P_3$, the clearance x between the free end 30 of the transfer device 22 and the ground 31 can decrease, wherein, in the fourth position $P_4$, the clearance $x_4$ between the free end 30 and the ground is greater than the clearance $x_3$ in the third position $P_3$. In this case, the clearance change, Δx, corresponds to the difference of the clearance $x_4$ in the fourth position $P_4$ and the clearance $x_3$ in the third position $P_3$. When the transfer device 22 is swivelled from the fourth position $P_4$ into the third position $P_3$, the transfer device 22 is swivelled from the setpoint position having the setpoint swivel angle φ $_{soll}$ into an operative position having the actual swivel angle φ $_{ist}$. In this case, the swivel-angle change Δφ corresponds to the difference between the setpoint swivel angle φ $_{soll}$ in the fourth position $P_4$ and the actual swivel angle φ $_{ist}$ in the third position $P_3$, wherein the setpoint swivel angle φ$_{soll}$ is greater than the actual swivel angle φ$_{ist}$ in the third position $P_3$.

Since a hauling vehicle 14 (FIG. 1) is disposed under or at least adjacent to the free end 30 of the transfer device 22 when crop 24 is transferred, the clearance between the free end 30 and the hauling vehicle 14 therefore also changes when the transfer device 22 swivels. As such, a collision may occur between the transfer device 22 and the hauling vehicle 14, for example, with a sideboard of the hauling vehicle 14. In addition, by swivelling the transfer device 22, it is possible, in particular, to swivel the free end 30 of the transfer device 22 out of the operator's direct field of vision, which can make it difficult to monitor the transfer process. In the direct field of vision, the operator can directly see and therefore monitor the transfer device 22, in particular the free end 30 of the transfer device 22, without much effort, for example. by a turn of the head.

In order to reduce the risk of a collision of the transfer device 22 with the hauling vehicle 14 or to avoid more difficult monitoring, a setpoint swivel angle φ $_{soll}$ can be set for the transfer of the crop 24, in which the transfer device 22 (in particular the free end 30 of the transfer device 22) has the greatest possible clearance from the ground 31 and, therefore, also from the hauling vehicle 14 and/or is disposed in the operator's direct field of vision. The adjustable setpoint swivel angle φ $_{soll}$ can also be a setpoint swivel angle range in which the transfer device 22 should be disposed, in particular, for transferring the crop 24.

The swivel angle of the transfer device 22 that sets in, namely, the actual swivel angle φ $_{ist}$, is measured using a sensor device 32. The sensor device 32 is designed as an electro-optical sensor device, for example, in the form of a stereo camera or a time-of-flight camera. An electro-optical sensor device 32 is disposed on the transfer device 22, for example, in the region of the free end 30 and connected to at least one evaluation and control device 34.

The agricultural harvesting machine 12 in the form of a combine harvester 16 depicted in FIG. moves at a ground speed $V_E$ across the field to be harvested and picks up crop 24 via the front attachment 18 thereof, for further processing. The ground speed $V_E$ of the harvesting machine 12 is automatically regulated, for example by the at least one evaluation and control device 34. In addition, the ground speed $V_E$ is held substantially at a settable constant value by a Tempomat function. The processed crop 24 is stored in the grain tank 20 and transferred to the trailer 28 by the transfer device 22. The transfer device 22 has already been swivelled into the operative position, wherein the transfer device 22 is disposed at an actual swivel angle φ $_{ist}$, which corresponds to the setpoint swivel angle φ $_{soll}$ that was set. In this case, the transfer device 22 is swivelled substantially at a right angle to the longitudinal axis 36 of the harvesting machine 12.

Figure 3:
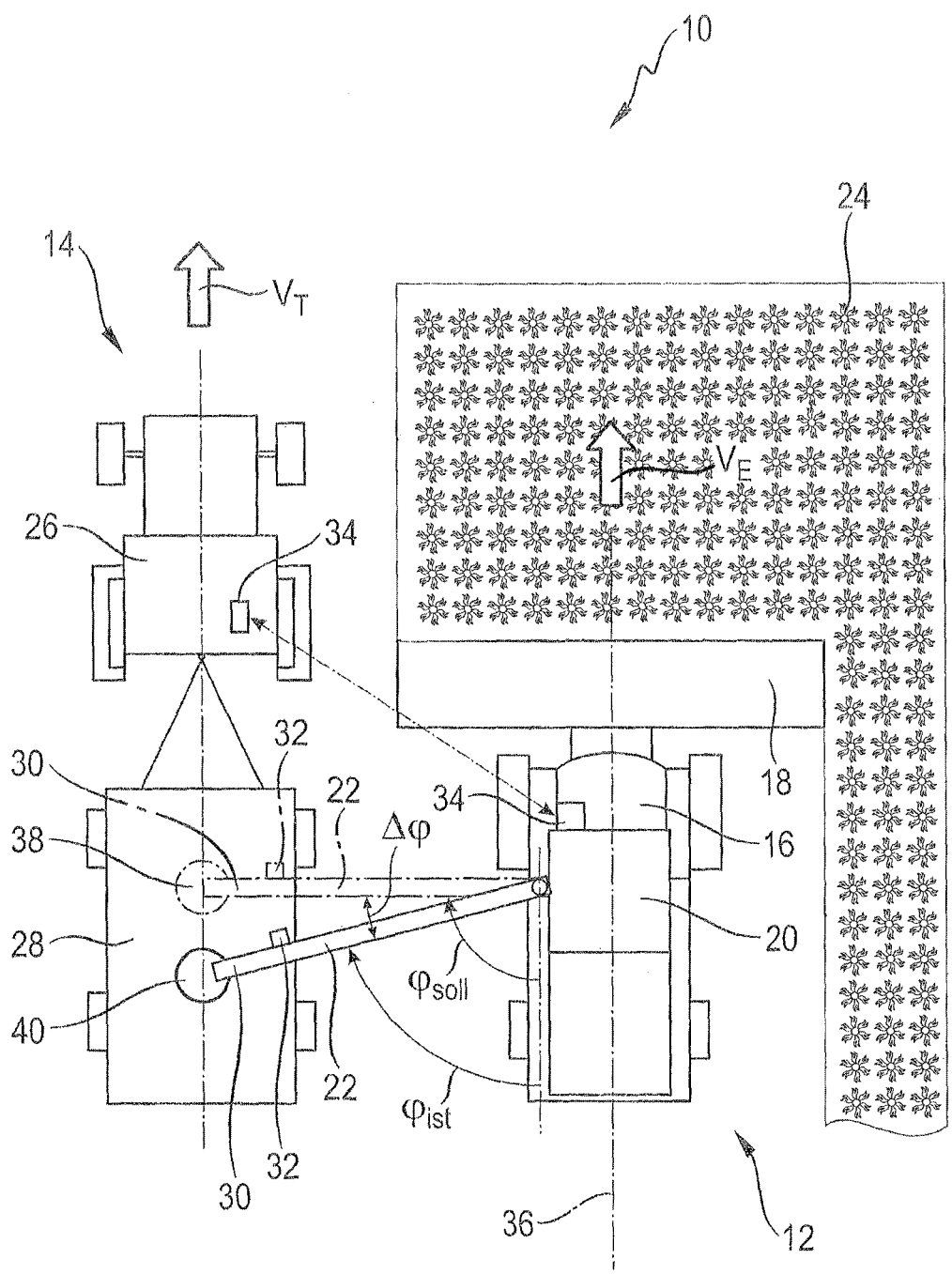
FIG. 3: shows a top view of the harvesting device depicted in FIG. 1.
Figure 4:
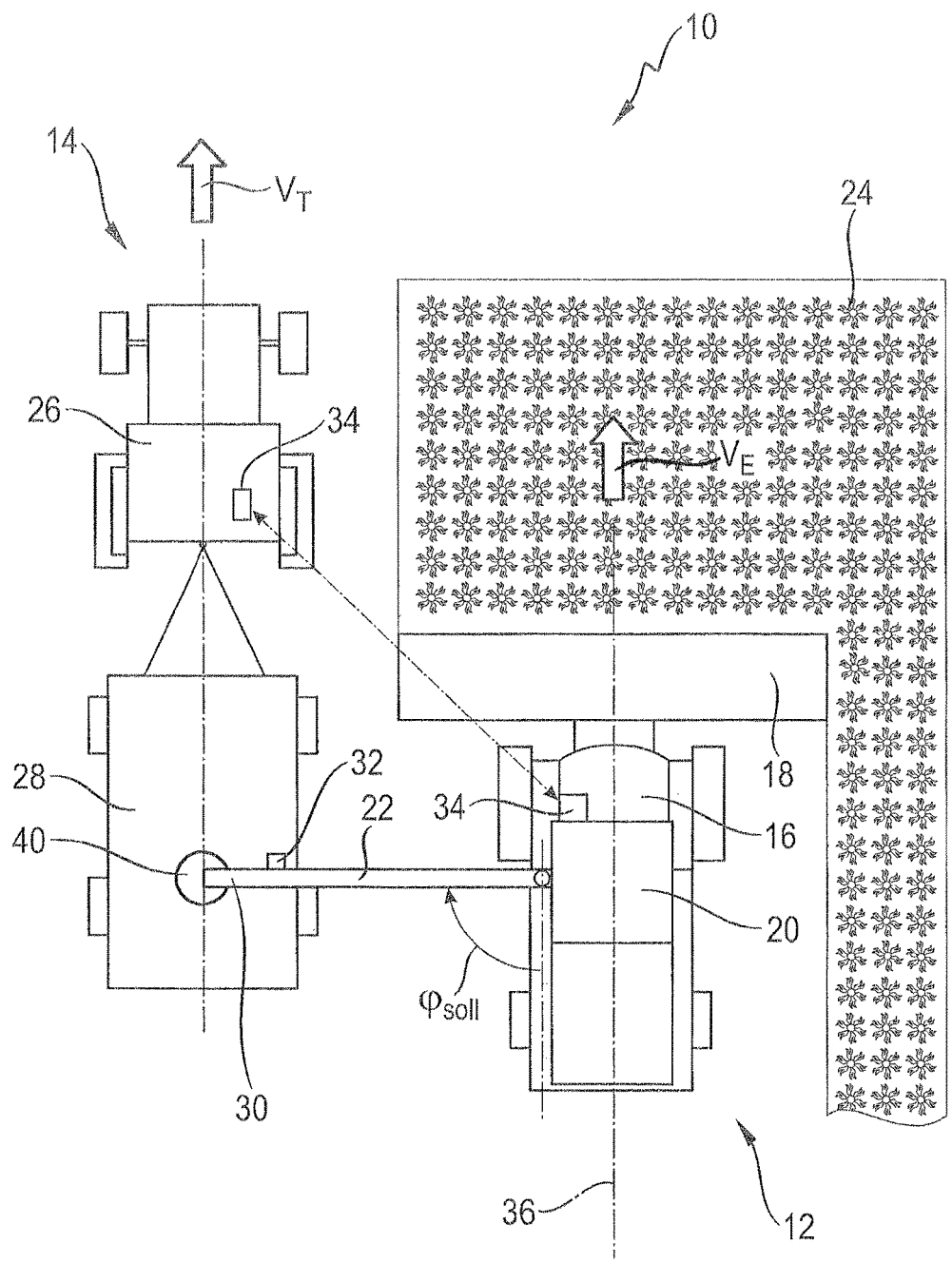
FIG. 4: shows a top view of the harvesting device depicted in FIG. 3, comprising a transfer device disposed at a setpoint swivel angle.

When transferred, the crop 24 impacts the hauling vehicle 14, which is the trailer 28 in this case, at a first impact point 38 (FIGS. 1 and 3). Depending on the available loading volume of the hauling vehicle 14 and the quantity of crop 24 that is transferred or will be transferred, it may be necessary to continue the transfer at at least a second impact point 40 (FIGS. 1, 3 and 4). In order to switch from the first impact point 38 to the second impact point 40 for transferring the crop 24, the transfer device 22 must be deflected by a certain angle. In this case, the deflection of the transfer device 22 corresponds to the swivel-angle difference Δφ, wherein the swivel-angle difference Δφ is the difference between the swivel angle φ, in particular the setpoint swivel angle φ $_{soll}$, that is associated with the first impact point 38, and the swivel angle φ, in particular the actual swivel angle φ $_{ist}$, that is associated with the second impact point 40.

The deflection and/or swivel-angle difference Δφ can be determined by the sensor device 32, in particular an electro-optical sensor device. The sensor device 32, which optically detects the first impact point 38 and the second impact point 40, can determine the path between the first impact point 38 and the second impact point 40 and, on the basis of the length of the transfer device 22, can determine the deflection and/or the swivel-angle difference Δφ that is required to swivel the transfer device 22 from the first impact point 38 to the second impact point 40. The conveyance of the crop 24 can be continued uninterrupted in this case. The deflection also can be determined by the evaluation and control unit 34, which is connected to the sensor device 32.

The transfer device 22, which has been swivelled to the second impact point 40, is shown as a dashed line in FIG. 1, wherein the clearance between the free end 30 and the hauling vehicle 14 has been diminished, since the transfer device 22 has been swivelled out of the setpoint swivel angle φ $_{soll}$ having the greatest possible clearance between the free end 30 and the ground 31 into the actual swivel angle φ $_{ist}$ having a smaller clearance between the free end 30 and the ground 31.

In order to return the transfer device 22, which is shown in a deflected position in FIG. 3, to the setpoint swivel angle φ $_q$and the setpoint position while retaining the second impact point 40, the at least one evaluation and control unit 34 can regulate the ground speed $V_E$ of the harvesting machine 12 and/or the ground speed $V_T$ of the hauling vehicle 14 depending on the deflection, i.e., the swivel-angle difference Δφ between the actual swivel angle φ $_{ist}$ and the setpoint swivel angle φ $_{soll}$ of the transfer device 22.

The at least one evaluation and control device 34 can be disposed on the agricultural harvesting machine 12. In order to enable the ground speed $V_T$ of the hauling vehicle 14 to be regulated, the hauling vehicle 14, for example, the tractor 26, can comprise a further evaluation and control device 34. The further evaluation and control device 34 can be used, at the least, to regulate the ground speed $V_T$ of the hauling vehicle 14. A plurality of evaluation and control devices 34 can wirelessly communicate with one another and exchange data, in particular, regarding the ground-speed regulation, by communication modules (not illustrated).

In order to return the transfer device 22 to the setpoint swivel angle $\varphi_{soll}$, the ground speed $V_E$ can be temporarily reduced, for example, until the transfer device 22 is disposed at the setpoint swivel angle $\varphi_{soll}$ once more, wherein the crop 24 also impacts the second impact point 40 at the setpoint swivel angle $\varphi_{soll}$ (FIG. 4). As an alternative, the ground speed $V_T$ of the hauling vehicle 14 also can be temporarily increased until the transfer device 22, which remains oriented onto the second impact point 40, has returned to the setpoint swivel angle $\varphi_{soll}$.

It is further possible to regulate the ground speeds $V_E$, $V_T$ of both vehicles in order to return the transfer device 22 to the setpoint swivel angle $\varphi_{soll}$. That is, the operator sets which vehicle 12, 14 or which vehicles 12, 14 should be regulated in terms of the ground speed $V_E$, $V_T$, respectively, in order to return the transfer device 22. The operator can therefore select whether the harvesting machine 12, the hauling vehicle 14, or both vehicles 12, 14 should be regulated for the return.

In order to minimize the reduction in harvesting output of the harvesting machine 12 caused by the transfer, for example, due to a ground speed $V_E$ having been reduced in order to transfer the crop 24, it is advantageous to leave unchanged, if possible, the ground speed $V_E$ at which the harvesting machine 12 performs harvesting and to only regulate the ground speed $V_T$ of the hauling vehicle 14. The transfer device 22, which is oriented onto the second impact point 40 and has been returned to the setpoint swivel angle $\varphi_{soll}$, is depicted in FIG. 4, wherein the actual swivel angle $\varphi_{ist}$ corresponds to the setpoint swivel angle $\varphi_{soll}$. Due to the displacement of the impact point 38, 40 counter to the direction of travel, the hauling vehicle 14 is positioned further forward relative to the harvesting machine 12 in this case than when transferring onto the first impact point 38 with a transfer device 22 that has been swivelled into the setpoint swivel angle $\varphi_{soll}$.

LIST OF REFERENCE CHARACTERS 10 harvesting device
12 agricultural harvesting machine
14 hauling vehicle
16 combine harvester
18 front attachment
20 grain tank
22 transfer device
23 swivel axis
24 crop
26 tractor
28 trailer
30 free end
31 ground
32 sensor device
34 evaluation and control unit
36 longitudinal axis
38 first impact point
40 second impact point
P position
$\varphi$ swivel angle
$\Delta\varphi$ swivel-angle difference
$\varphi_{soll}$ setpoint swivel angle
$\varphi_{ist}$ actual swivel angle
x clearance
$\Delta x$ clearance change
$V_E$ ground speed of harvesting machine
$V_T$ ground speed of hauling vehicle As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A harvesting system or device, comprising:
   a crop discharging agricultural harvesting machine having a transfer device configured to swivel about a swivel angle ($\varphi$), for transferring crop to a hauling vehicle, wherein a setpoint swivel angle ($\varphi_{soll}$) for discharging the crop is set so that a longitudinal axis of the transfer device is at a right angle to a longitudinal axis of the agricultural harvesting machine;
   a sensor device configured for determining the swivel angle ($\varphi$), a deflection of the transfer device or both; and
   an evaluation and control device connected to the sensor device, the evaluation and control device being configured for controlling the transfer device and the ground speed ($V_E$) of the harvesting machine, the ground speed ($V_T$) of the hauling vehicle, or both;
   wherein the hauling vehicle receives the crop that is discharged from the agricultural harvesting machine such that the discharged crop impacts the hauling vehicle at an adjustable impact point;
   wherein if the sensor device detects that a deflection of the transfer device deviates from the setpoint swivel angle ($\varphi_{soll}$), the evaluation and control device then automatically effects a return of the transfer device to the setpoint swivel angle ($\varphi_{soll}$) by decreasing a ground speed ($V_E$) of the agricultural harvesting machine, by increasing a ground speed ($V_T$) of the hauling vehicle, or both, if the swivel angle ($\varphi$) is less than the setpoint swivel angle ($\varphi_{soll}$), such that a position of the adjustable impact point remains substantially unchanged;
   wherein if a new impact point is set that is located behind a previous impact point in a direction of travel, the control and evaluation unit swivels the transfer device to the new impact point, which causes a deflection from the setpoint swivel angle ($\varphi$ soll) to an actual swivel angle ($\varphi_{ist}$) and in response to the sensor detecting a difference between the setpoint swivel angle ($\varphi_{soll}$) and the actual swivel angle ($\varphi_{ist}$), the transfer device is automatically returned to the setpoint swivel angle ($\varphi_{soll}$), from the actual swivel angle ($\varphi_{ist}$), by the evaluation and control device decreasing the ground speed ($V_E$) of the agricultural harvesting machine, increasing the ground speed ($V_T$) of the hauling vehicle, or both, nearly simultaneously with the swiveling, while the new impact point is retained.

2. The harvesting device according to claim 1, wherein a clearance (x) between a free end of the transfer device that discharges the crop and the ground is varied depending on the swivel angle ($\varphi$).

3. The harvesting device according to claim 2, wherein the setpoint swivel angle ($\varphi_{soll}$) is reached, the free end of the transfer device has the greatest clearance from the ground.

4. The harvesting device according to claim 1, wherein the adjustable impact point of the crop is set automatically by use of the evaluation and control device, manually or both.

5. The harvesting device according to claim 1, wherein the transfer device automatically tracks the adjustable impact point that was set.

6. The harvesting device according to claim 1, wherein an operator selects at least one of the agricultural harvesting machine and the hauling vehicle to be used to return the transfer device, and wherein the evaluation and control device regulates the ground speed ($V_E$, $V_T$) of said agricultural harvesting machine, hauling vehicle or both.

7. The harvesting device according to claim 1, wherein the adjustable impact point of the crop is determined and set by the evaluation and control device.

8. A method for regulating a ground speed of a harvesting system comprising a crop discharging agricultural harvesting machine with an evaluation and control device, a transfer device that swivels about a swivel angle ($\varphi$) for transferring crop, a hauling vehicle that receives the crop at an impact point and a sensor connected to the evaluation and control device for detecting an actual swivel angle ($\varphi_{ist}$) of the transfer device, the method comprising steps of:

setting a setpoint swivel angle ($\varphi_{soll}$) and the impact point for discharging the crop, so that a longitudinal axis of the transfer device is at a right angle to a longitudinal axis of the crop discharging agricultural harvesting machine;

detecting with the sensor if the deflection of the transfer device deviates from the setpoint swivel angle ($\varphi_{soll}$), and automatically returning the transfer device to the setpoint swivel angle ($\varphi_{soll}$) with the automation and control device by decreasing a ground speed ($V_E$) of the agricultural harvesting machine, by increasing a ground speed ($V_T$) of the hauling vehicle or both, if the swivel angle ($\varphi$) is less than the setpoint swivel angle ($\varphi_{soll}$), while a position of the impact point remains substantially unchanged; and if a new impact point is set, swiveling the transfer device to the new impact point, causing a deflection from the setpoint swivel angle ($\varphi$ soll) to the actual swivel angle ($\varphi_{ist}$) and in response to the sensor detecting a difference between the setpoint swivel angle ($\varphi_{soll}$) and the actual swivel angle($\varphi_{ist}$), automatically decreasing the ground speed (VE) of the agricultural harvesting machine, increasing the ground speed ($V_T$) of the hauling vehicle, or both, nearly simultaneously with the swiveling, if the swivel angle ($\varphi$) is less than the setpoint swivel angle ($\varphi_{soll}$), to return the transfer device to the setpoint swivel angle ($\varphi$ soll), from the actual swivel angle ($\varphi_{ist}$), while retaining the new impact point.

9. The method according to claim 8, further comprising a step of varying a clearance (x) between a free end of the transfer device that discharges the crop and the ground depending on the swivel angle ($\varphi$).

10. The method according to claim 9, wherein the setpoint swivel angle ($\varphi_{soll}$) is set such that the free end of the transfer device has the greatest clearance from the ground.

11. The method according to claim 8, wherein the impact point, the deflection of the transfer device or both are set manually by the operator or are set automatically by the evaluation and control device.

* * * * *